United States Patent [19]

Schneeberger et al.

[11] Patent Number: 4,884,076
[45] Date of Patent: Nov. 28, 1989

[54] FOAM SUPPORTED ELECTROMAGNETIC ENERGY REFLECTING DEVICE

[75] Inventors: Richard F. Schneeberger, Snyder; Charles K. Akers, Williamsville, both of N.Y.

[73] Assignee: Calspan Corporation, Buffalo, N.Y.

[21] Appl. No.: 427,087

[22] Filed: Sep. 29, 1982

[51] Int. Cl.[4] .................................................. G01S 7/36
[52] U.S. Cl. ............................................. 342/5; 342/13
[58] Field of Search .................. 343/18 B, 18 C, 18 A, 343/18 E, 18; 350/103, 102, 109; 250/526; 356/5; 89/36 H, 1.11; 342/5, 9, 13, 14, 34, 169

[56] References Cited

U.S. PATENT DOCUMENTS

| 2,352,862 | 7/1944 | Rabuse | 343/18 E |
|---|---|---|---|
| 2,580,921 | 1/1952 | Iams | 343/18 C |
| 2,629,115 | 2/1953 | Hansen | 343/18 C |
| 2,752,594 | 6/1956 | Link et al. | 343/18 R |
| 2,872,675 | 2/1959 | Kennaugh | 343/18 C |
| 2,881,425 | 4/1959 | Gregory | 343/18 B |
| 2,957,417 | 10/1960 | Musgrave | 343/18 E |
| 3,103,662 | 9/1963 | Gray et al. | 343/18 C |
| 3,167,769 | 1/1965 | Boyer | 343/18 R |
| 3,181,158 | 4/1965 | Feldman | 343/18 C |
| 3,217,325 | 11/1965 | Mullin | 343/18 R |
| 3,604,001 | 9/1971 | Deal | 343/18 C |
| 4,034,375 | 7/1977 | Wallin | 343/18 B |
| 4,050,073 | 9/1977 | Wesch | 343/18 A |
| 4,096,479 | 6/1978 | Van Buskirk | 343/18 C |
| 4,126,312 | 11/1978 | Kreuzer et al. | 89/36 H |
| 4,287,243 | 9/1981 | Nielsen | 343/18 A X |
| 4,359,737 | 11/1982 | Bond | 343/18 A |

FOREIGN PATENT DOCUMENTS 2036935 7/1980 United Kingdom .............. 343/18 B

OTHER PUBLICATIONS

Cuming et al., Plastics and Ceramic Foams for Electronic Applications, Electrical Manufacturing, May 1958, pp. I–VI.
Hines, William, Plastic 'Smoke Clouds' May Aid Space Study, 4/8/59, The Evening Star, Washington, D.C. p. A5.

Primary Examiner—Brian S. Steinberger
Attorney, Agent, or Firm—Biebel, French & Nauman

[57] ABSTRACT

A device for reflecting electromagnetic energy comprises a solidified foam mass which has reflector agents embedded therein for reflecting at least one frequency of electromagnetic energy. The frequency or frequencies of electromagnetic energy reflected are within the region of the electromagnetic spectrum utilized for radar signaling, the infrared region, the visual region or within any combination of those regions. A variety of dyes are used for reflecting frequencies within the infrared region of the electromagnetic spectrum and a variety of phosphorous compounds are utilized for reflecting frequencies within the infrared region of the electromagnetic spectrum. Radar energy is reflected by a multitude of discreet electrically conducting elements or dipoles of a length approximately equal to one-half ($\frac{1}{2}$) the wave length of the radar energy to be reflected which dipoles are distributed in an approximately uniform manner throughout the mass during the formation of the foam mass.

9 Claims, 1 Drawing Sheet

FOAM SUPPORTED ELECTROMAGNETIC ENERGY REFLECTING DEVICE

BACKGROUND OF THE INVENTION

This invention is related generally to devices for reflecting electromagnetic energy and, more particularly, to an improved device wherein a reflecting agent is distributed throughout and supported by a solidified foam mass to form the reflecting device.

The size and strength of military installations and equipment present at staging areas or during various operations can be determined by modern day electromagnetic sensing equipment. Such equipment includes radar and devices for sensing electromagnetic energy in the infrared and visual regions of the electromagnetic spectrum. Due to electronic miniaturization, such equipment can be placed on board airplanes or indeed orbited about the earth in satellites.

To maintain an element of secrecy and surprise as well as misleading an enemy force which might be observing military installations and operations, it is desirable to confuse or deceive the enemy force monitoring the sensing equipment. Deception can be performed by active electronic equipment which defeats proper operation of the observing equipment or by passive counter-measures to change the energy reflected back to the equipment. Common examples of passive counter-measures include chaff and decoys for radar equipment.

When decoys are utilized, they simulate buildings, gun emplacements, missile sites or other military equipment, such as tanks, trucks, aircraft and the like. Decoys can be constructed to resemble the particular object simulated and then covered with electrically conductive material so that the radar reflective characteristics of the object simulated are accurately reproduced by the decoy. Alternately, a corner reflector can be utilized as a radar decoy. Each of these forms of decoy construction suffers disadvantages. In the case of a physically accurate model which is constructed and then covered with reflective material, conventional construction techniques are quite time consuming and expensive. However, such physically accurate models simulate a particular structure and present quite accurate reflections to a searching radar. Although the construction problems are reduced when a corner reflector is utilized as a decoy, such decoys do not physically resemble the objects to be simulated and the reflections vary with the angle of incidence of the searching radar and, hence, do not accurately represent the objects.

It is, thus, apparent that the need exists for an electromagnetic energy reflective device and a method for constructing that device which permits rapid, inexpensive construction as well as providing an accurate simulation of the electromagnetic reflective characteristics of an object to be represented by the decoy.

SUMMARY OF THE INVENTION

In accordance with the present invention, a device for reflecting electromagnetic energy comprises a solidified foam mass which has reflector means embedded therein for reflecting at least one frequency of electromagnetic energy. The frequency or frequencies of electromagnetic energy reflected can be within the region of the electromagnetic spectrum utilized for radar signaling, within the infrared region, within the visual region or within any combination of those regions. For visual reflection, various dyes are distributed within the solidified foam mass. For infrared reflection, the foam must be selected such that it does not absorb electromagnetic energy in an infrared region of interest. Since this is the case for most foams usable in the present invention, infrared energy is reflected from almost all the devices made in accordance with the invention. For radar reflection, a multitude of discreet electrically conducting elements are embedded within the solidified foam, mass. The electrically conducting elements are of a length approximately equal to one-half ($\frac{1}{2}$) the wavelength of the electromagnetic energy to be reflected and are distributed in an approximately uniform manner throughout the foam mass. The density of the discreet electrically conducting elements is selected so that the reflective characteristics of the foam mass represent the object to be simulated by the mass.

The electromagnetic energy reflecting device in accordance with the present invention can be constructed so that the foam mass physically resembles the object to be simulated. In this way, not only can radar and infrared observing equipment be deceived by the devices, but also optical observation tends to verify the reports obtained by the radar and infrared observing equipment.

A variety of foam materials can be utilized in accordance with the present invention so that the solidified foam mass is either rigid or flexible depending upon the requirements for simulation of a particular object. To facilitate physical resemblence of an object to be simulated, the foam mass can be constructed from a rigid foam and either molded to the desired shape or formed and cut to that shape.

For radar frequencies of particular interest, the electrically conducting elements range in length between approximately 0.85 centimeters and 7.5 centimeters. Of course, the electrically conducting elements or dipoles need not be restricted by this range and may comprise alternate lengths to reflect electromagnetic energy outside of the particular frequency range covered by the above dipole lengths (2 to 18 gigahertz).

Also disclosed in the present application is a method for constructing a device for reflecting electromagnetic energy comprising the steps of generating a foam mass and introducing reflector means into the foam mass during the generating step. For the reflection of visable energy, the reflector means comprises one or a combination of several dyes. For the reflection of infrared energy, one of the commonly available foams which does not absorb infrared energy should be selected. For the reflection of radar energy, the reflector means comprises a multitude of discreet electrically conductive elements having a length approximately equal to one-half ($\frac{1}{2}$) the wavelength of the radar energy to be reflected. The electrically conducting elements are introduced into the mass during the generating step so that they attain an approximately uniform distribution throughout the foam mass. Although the steps can be performed in any number of ways, two preferred embodiments of the constructing method are disclosed.

In the first method, the generating step comprises passing the material to be foamed through a foaming nozzle and the step introducing the reflector agents into the foam comprises metering those agents into the foaming nozzle so that they are intermixed with the material as it is foamed. The second method comprises the steps of combining a foam generating material, a blowing agent for the foam generating material, and one or more reflector agent in a pressurized environment and controllably releasing the resulting combination from the pressurized environment so that the material forms a foam mass with the reflector agents distributed throughout the mass in an approximately uniform and random distribution.

It is, therefore, an object of the present invention to provide an improved device for reflecting electromagnetic energy; to provide an improved device for reflecting radar energy which provides a dipole volume density adequate to simulate large targets; to provide an improved device for reflecting radar energy wherein a dipole volume density is provided which is adequate to simulate large targets yet having a relative low density and therefore increasing the boyancy of heavy dipole material; to provide an improved device for reflecting radar energy wherein dipoles are encapsulated in a solidified foam mass to form a radar decoy which has a desired radar signature characteristic of an object to be simulated; and to provide a method for constructing a device reflecting electromagnetic energy comprising the steps of generating a foam mass and introducing reflector means distributed within the mass.

Other objects and advantages of the invention will be apparent from the following description, the accompanying drawings and the appended claims.

BRIEF DESCRIPTION OF THE DRAWINGS

FIG. 2 shows the use of wind blown reflectors in accordance with the present invention to simulate moving objects such as tanks, troop carriers, trucks and the like.

DETAILED DESCRIPTION OF THE INVENTION

Figure 1:
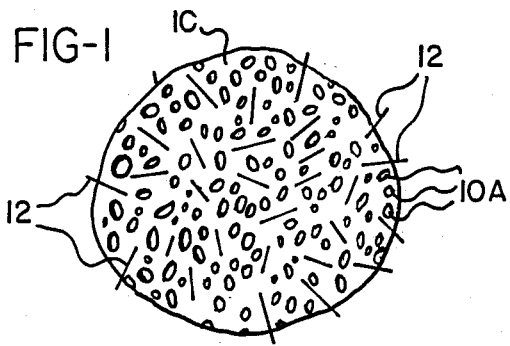
FIG. 1 is a cross section of a portion of a solidified foam mass having randomly oriented electrically conducting elements or dipoles embedded therein.

In accordance with the present invention, decoys typically used for military deception are conveniently and inexpensively formed from solidified foam masses having electromagnetic reflecting agents embedded therein. The particular reflecting agent embedded within the foam, the type of foam and the shape of the foam mass are selected to provide a decoy having desired characteristics for a particular application.

For example, the reflecting agent can reflect electromagnetic energy within the frequency range used for radar signaling so that the decoy accurately reflects radar energy representative of the object to be simulated. In addition to or in place of such radar energy reflectors, reflecting agents can be dispersed within the foam mass for reflecting electromagnetic energy in the visual region of the electromagnetic spectrum. Reflection in the infrared region of the electromagnetic spectrum is assured by selection of a foam which does not absorb infrared energy.

The present invention is particularly well suited for radar energy reflecting decoys because it provides a mass distribution of electrically conducting elements or dipoles within the foam mass. Such a mass distribution is required to accurately simulate many objects and particularly large objects. Each object to be simulated, such as a truck, tank or weapons carrier, has its own unique radar signature which requires a particular density of distributed dipoles in the decoy. The specific amounts of electrically conducting elements, i.e., dipoles or chaff, to simulate a given object are well known in the art of radar technology and will not be described herein.

For the reflection of electromagnetic energy having frequencies in the infrared and visual portions of the electromagnetic spectrum, the reflection phenomenon is a surface effect and, hence, the mass distribution within a decoy is unimportant. Thus, radar decoys can be constructed in accordance with the present invention (or by prior art methods) and then coated or painted with appropriate reflecting agents such as camouflage paint for the visual range.

There are disadvantages to such painting operations. Initially, there is the additional time and labor involved in physically applying the materials to a decoy. Also, when coating foamed radar decoys generated in accordance with the present invention, the solvents contained in the camouflage paint may be incompatible with the solidified foam mass and may tend to dissolve the foam upon application. Thus, in addition to eliminating the material application step after a decoy is formed, the visual reflecting dyes can be embedded within the foam mass even though only the reflecting agents on the surface of the decoy provide for the reflection of the specific frequencies of electromagnetic energy required.

Dependent upon the size and method of forming a particular decoy, molecular or particulate reflecting agents for the visual regions of the electromagnetic frequency spectrum may be selectively incorporated into the decoy so that they occur only within the exterior regions of the decoy to thereby reflect the desired frequencies of electromagnetic energy while conserving the amount of reflector agent required to construct a given decoy.

FIG. 1 is a cross section of a portion of a solidified foam decoy showing the foam 10 having a multitude of randomly oriented, electrically conducting elements 12 or dipoles embedded therein. For the radar frequency ranges which would normally be used for surveillance or target acquisition, the electrically conducting elements 12 can comprise needle-like devices which range in length between approximately 0.85 centimeters and 7.5 centimeters. Of course, the electrically conducting elements need not be restricted to this range in the event that electromagnetic energy of frequencies outside of the 2 to 18 gigahertz range covered by the above dipole lengths is desired to be reflected. The reflector agents for reflecting visual portions of the electromagnetic spectrum tend to combine with the foam materials to surround the individual evacuated areas 10A of the solidified foam mass, and, hence, become a portion of the mass.

A variety of foam materials can be utilized in accordance with the present invention so that the solidified foam mass is either rigid or flexible depending upon the requirements of the particular decoy being formed. For more permanent type simulated installations, decoys can be formed from foam materials such as polyurethane foam which result in rigid, long-lived solidified foam masses which are substantially permanent in nature. Objects to be simulated by such permanent decoys include buildings and various structures associated with fixed installations such as missile sites or air fields.

At the other end of the spectrum are short-lived decoys which are utilized for short term applications, for example, a diversion for a landing force. Decoys for such applications can be produced from proteinaceous foaming materials which may have a life expectancy of from five minutes to eight hours depending upon the particular type of foam. The use of a given foam to produce a decoy for a particular object such as a tank, a truck, or an aircraft depends upon the given situation and the desired lifetime for the decoy.

In the case of permanent decoy installations, the foam mass may be initially formed and then carved to physically resemble the structure to be simulated. In the case of less permanent decoys, for example, battlefield decoys, blobs of solidified foam can be formed to provide the proper radar and/or infrared reflective characteristics and camouflage coloration can be provided to conceal the decoys from an enemy force.

Figure 2:
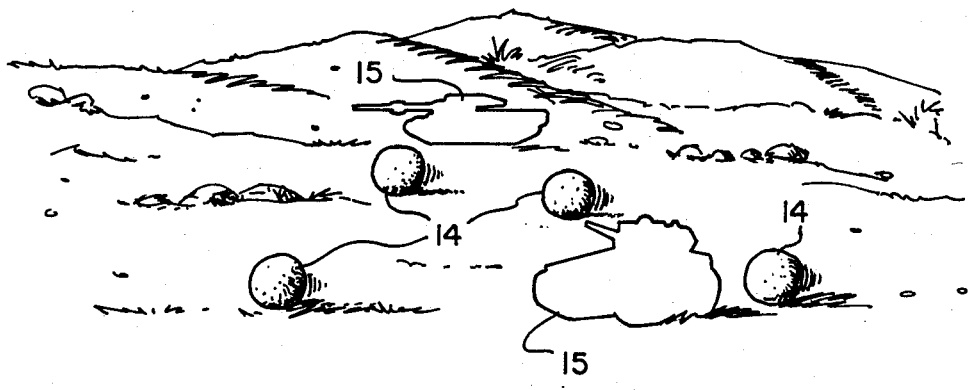

As shown in FIG. 2, it is contemplated in accordance with the present invention that substantially spherical decoys 14 can be constructed and set free to be moved by the wind. Such tumbling decoys can simulate roving groups of tanks, trucks or other mobile equipment. Similarly, decoys 15 formed in accordance with the present invention can be propelled by foot soldiers to simulate armored support for an otherwise unsupported infantry unit.

In accordance with the present invention, the decoys are constructed by passing material to be foamed through a foaming nozzle which also serves to introduce metered reflective agents into the foam mass as the foam is being generated. Also, a foam generating material, a blowing agent for that material, and a desired quantity of one or more reflective agents are combined in a pressurized environment and controllably released so the material forms a foam mass with the reflective agents distributed throughout the mass in an approximately uniform and random distribution. These as well as other foam generating techniques known in the art are contemplated for generation of electromagnetic energy reflecting devices in accordance with the present invention.

While the methods and articles herein described constitute preferred embodiments of the invention, it is to be understood that the invention is not limited to these precise methods and articles, and that changes may be made therein without departing from the scope of the invention which is defined in the appended claims.

What is claimed is:

1. An electromagnetic energy reflecting decoy comprising a solidified foam mass of a volume similar to that of an object to be simulated and having a multitude of discrete electrically conducting elements embedded therein for reflecting energy in the radar frequency ranges, said elements having a length approximately equal to one-half the wave length of the electromagnetic energy to be reflected thereby and being dispersed throughout said mass in an approximately uniform distribution.

2. The electromagnetic energy reflecting decoy of claim 1 wherein the density of said discrete electrically conducting elements is selected so that the reflective characteristics of said mass closely approximate an object to be simulated by said mass.

3. The electromagnetic energy reflecting decoy of claim 2 wherein said foam mass is constructed to physically resemble the object to be simulated.

4. The electromagnetic energy reflecting decoy of claim 3 wherein said foam is rigid upon solidification.

5. The electromagnetic energy reflecting decoy of claim 4 wherein molecular or particulate material is added to said foam to reflect electromagnetic energy in the visual region of the spectrum.

6. The electromagnetic energy reflecting decoy of claim 1, 2, 3, 4 or 5 wherein said discrete electrically conducting elements range in length between approximately 0.85 centimeters and 7.5 centimeters to reflect energy in the 2 to 18 gigahertz radar frequency ranges.

7. The electromagnetic energy reflecting decoy comprising a solidified foam mass of a volume similar to that of an object to be simulated and having a multitude of discrete electrically conducting elements embedded therein for reflecting energy in the radar frequency ranges, said elements having a length approximately equal to one-half the wave length of the electromagnetic energy to be reflected thereby and being dispersed throughout said mass in an approximately uniform distribution, said decoy being formed in a substantially spherical form whereby said decoy has a relatively low density and can be moved by the wind or propelled by foot soldiers to simulate movement of said decoy.

8. The electromagnetic energy reflecting decoy of claim 7 wherein the density of said discrete electrically conducting elements is selected so that the reflective characteristics of said mass closely approximate an object to be simulated by said mass.

9. The electromagnetic energy reflecting decoy of claim 8 wherein said discrete electrically conducting elements range in length between approximately 0.85 centimeters and 7.5 centimeters to reflect energy in the 2 to 18 gigahertz radar frequency ranges.

* * * * *